United States Patent [19]

Hammitt et al.

[11] 4,165,654
[45] Aug. 28, 1979

[54] HIGH RESPONSE RATE PRESSURE PULSE SENSING PROBE WITH WIDE TEMPERATURE RANGE APPLICABILITY

[76] Inventors: Frederick G. Hammitt, 1306 Olivia St., Ann Arbor, Mich. 48104; Jia-Bo G. Hwang, 1435 Sunnybrook Dr., Naperville, Ill. 60540

[21] Appl. No.: 896,351

[22] Filed: Apr. 14, 1978

[51] Int. Cl.² .............................................. G01L 9/08
[52] U.S. Cl. ....................................... 73/723; 73/777
[58] Field of Search .................. 73/167, 723, 88.5 SD, 73/753, 754, 777

[56] References Cited

U.S. PATENT DOCUMENTS

| | | | |
|---|---|---|---|
| 3,672,223 | 6/1972 | Spescha | 73/723 |
| 3,886,792 | 6/1975 | Change et al. | 73/167 |
| 4,052,628 | 10/1977 | Hayer | 73/723 |
| 4,088,907 | 5/1978 | Jones et al. | 73/88.5 SD |

Primary Examiner—Donald O. Woodiel
Attorney, Agent, or Firm—Olsen and Stephenson

[57] ABSTRACT

A probe for measuring the amplitude of high frequency pressure pulses in a high or low temperature fluid environment comprising a hollow housing structure having an open end covered by a flexible metallic diaphragm member. A transducer is located in the housing and is forcibly maintained in direct engagement with the diaphragm member. Pressure pulses in the high or low temperature fluid medium deflect the diaphragm member, which is in contact with the transducer, causing it to produce electrical signals representative of the pressure pulses impinging against the diaphragm member. These electrical signals are transmitted to electronic recording and analyzing equipment to provide an accurate reading of the sensed pressure pulses.

4 Claims, 4 Drawing Figures

HIGH RESPONSE RATE PRESSURE PULSE SENSING PROBE WITH WIDE TEMPERATURE RANGE APPLICABILITY

BACKGROUND OF THE INVENTION

The present invention relates generally to a sensing probe for detecting pressure pulses in fluid medium, and more particularly, to a sensing probe capable of sensing high frequency pressure pulses in a fluid medium having either a high or low temperature.

Conventional apparatus for measuring the amplitude of pressure pulses in an extreme temperature fluid medium generally includes a wave guide probe which uses a metallic rod that is immersed in the fluid medium. The pressure pulses impinge against the metallic rod which mechanically transmits vibrations to a transducer mounted on the rod at a location away from the fluid. The use of a wave guide, however, hinders the ability of the probe to sense high frequency pressure pulses since the wave guide may attenuate or otherwise alter pressure pulse signals prior to their detection by the transducer. Therefore, the accuracy, signal strength, and useful response rate of a wave guide probe is diminished. It is the object of the present invention, therefore, to provide a probe for measuring high frequency pressure pulses in a fluid medium having a range of temperatures that extends between extremely high and low values.

SUMMARY OF THE INVENTION

In accordance with the present invention, a probe is provided comprising an elongated housing structure having an axial passageway and an open end communicating with the passageway. A flexible metallic diaphragm member is sealably mounted on the housing structure in covering relation with the open end. A transducer, such as a piezoelectric crystal is located in the housing passageway and is maintained in direct engagement with the diaphragm member. A holder member which supports the transducer is mounted on an annular insulating sleeve structure also having an axial passageway. The annular sleeve structure extends substantially through the housing passageway and a conductor which is connected to the transducer extends through the sleeve passageway through the housing structure to a location spaced from the probe. The insulating sleeve structure is forcibly urged in the direction of the diaphragm by a spring that is interposed between the insulating sleeve structure and the housing structure. The spring means therefore urges the transducer into direct continuous engagement with the diaphragm member so that the high frequency pressure pulses cause the diaphragm member to deflect directly in contact against the transducer which generates electrical signals which are representative of the sensed pressure pulses and which are transmitted by the conductor to analyzing and read-out equipment.

The probe of this invention is capable of measuring high frequency pressure pulses because the transducer is located in close proximity to the surface against which the pressure pulses strike, being separated from the fluid only by the flexible diaphragm member which is readily flexed against the transducer as the pressure pulses impinge upon its exposed surface. The flexing natural frequency of the diaphragm member and the axial natural frequency of the piezoelectric crystal determines the maximum useful response frequency of the probe. The probe is constructed having a casing cap that can easily be removed to enable the replacement of the transducer with another transducer having different frequency and sensitivity characteristics suitable for the desired test purposes. Moreover, by forcibly urging the transducer into direct engagement with the diaphragm, the transducer is capable of measuring tensile as well as compressive pulses in the fluid even though thermal distortions in the diaphragm member may occur by virtue of a high or low temperature environment. The probe of this invention is capable of measuring pressure pulses having durations of less than one microsecond in fluid mediums having either cryogenic temperatures or temperatures up to approximately 1,000° F.

Further objects, features and advantages of the present invention will become apparent from a consideration of the following description when taken in connection with the appended claims and the accompanying drawing in which:

Figure 1:
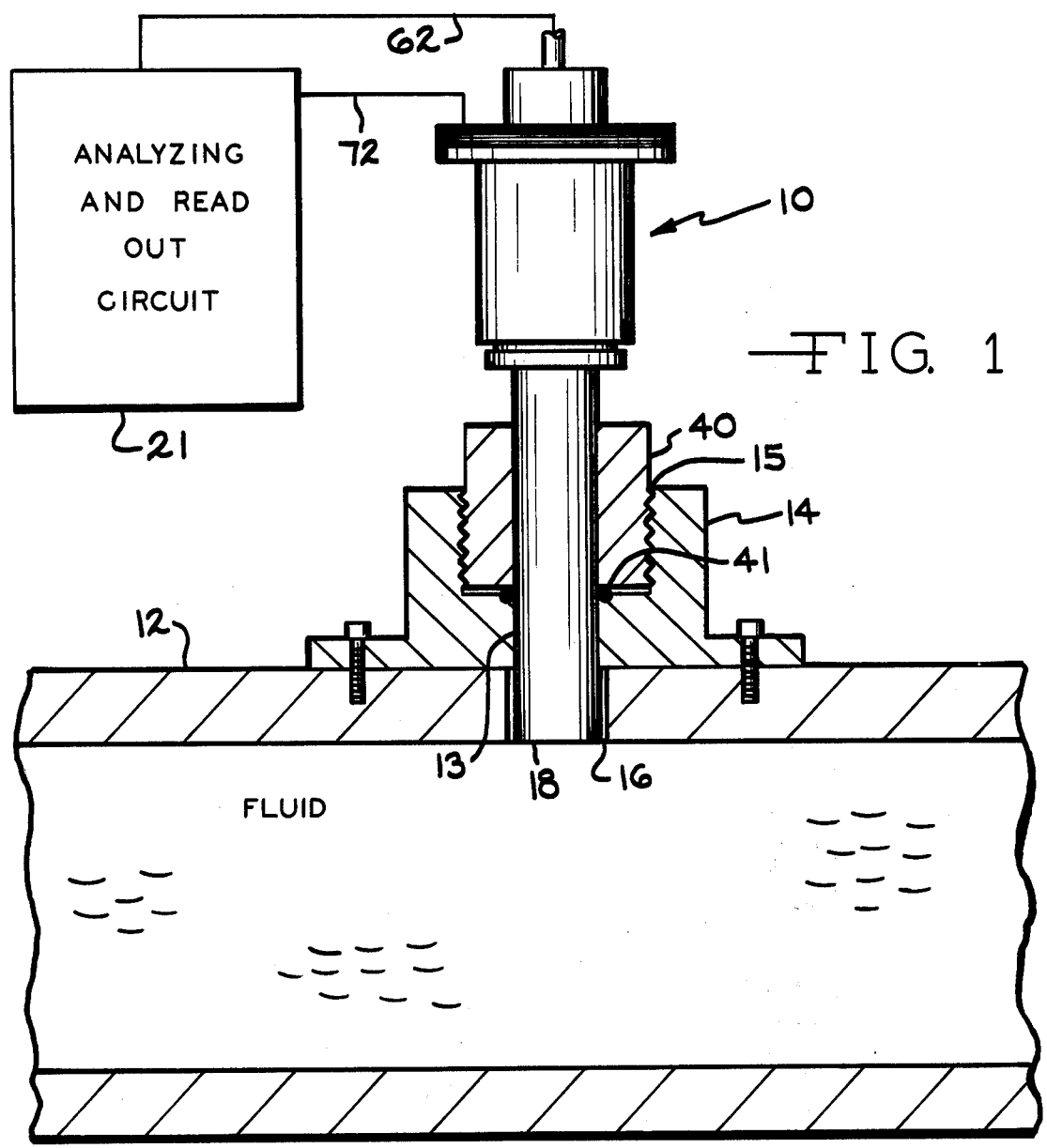
FIG. 1 is a diagrammatic illustration of the probe of the present invention shown supported on a pipe for measuring pressure pulses in a fluid medium in the pipe.

With reference to the drawing, the sensing probe of the present invention, indicated generally at 10 in FIG. 1, accurately measures high frequency pressure pulses that exist in a fluid, either liquid or gas over a broad temperature range. For example, the probe 10 can be employed to sense cavitation pressure pulses generated in a high temperature fluid flowing in a pipe 12. A casing 14 having a passageway 13 and an internally threaded recess 15 is mounted on the pipe 12 and supports the probe 10 which extends through the recess 15, the passageway 13 and an aligned opening 16 in the wall of the pipe 12 into the flow region. An externally threaded sleeve 40 slidably fits on the probe 10 and is threadably mounted on the casing 14 to support the probe 10 at the proper location. An O-ring 41 is interposed between the sleeve 40 and the casing 14 and surrounds the probe 10 to insure a fluid tight seal. Other methods of sealably mounting the probe 10 in an operational location, however, can readily be effected.

The probe 10 is positioned so that its sensing head, indicated generally at 18 is flush with the inner surface of the pipe wall. The output of the probe 10 is connected to the appropriate analyzing and recording equipment 21 which amplifies, analyzes, and records the output of the probe 10. Although the sensing head 18 is shown flush with the inner surface of the pipe wall, it is to be understood that the probe 10 can be fully immersed into the flowing fluid to obtain readings of pressure pulses at the desired location within the pipe 12.

Figure 2:
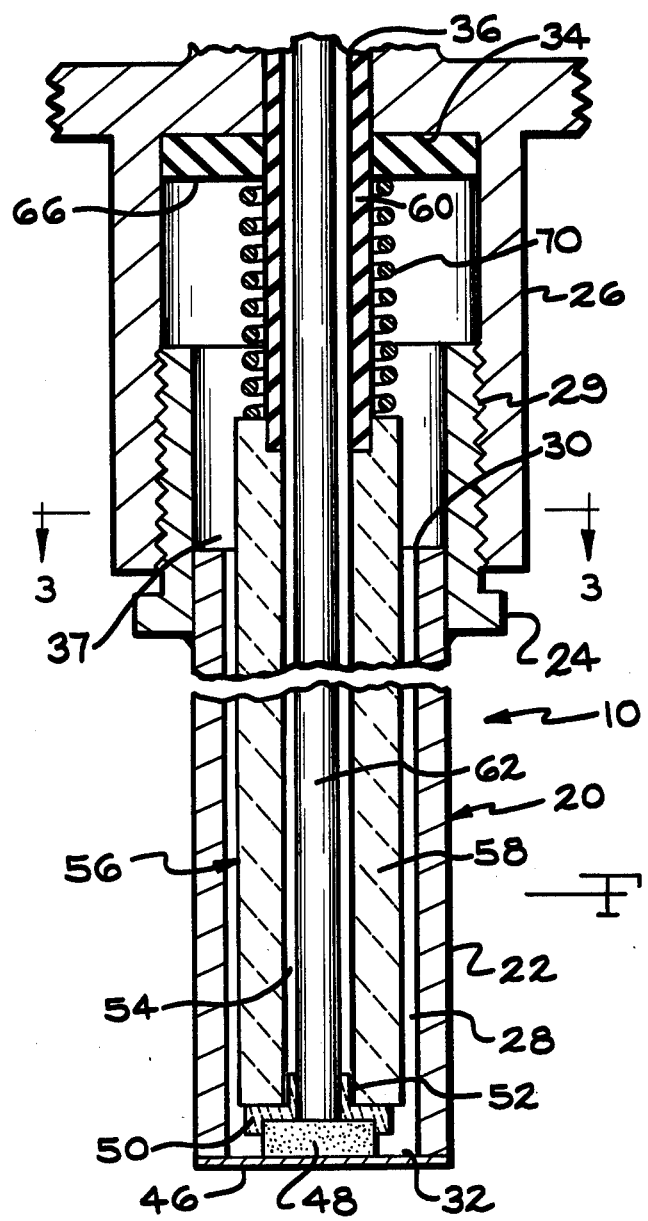
FIG. 2 is a sectional elevational view of the probe of the present invention.
Figure 3:
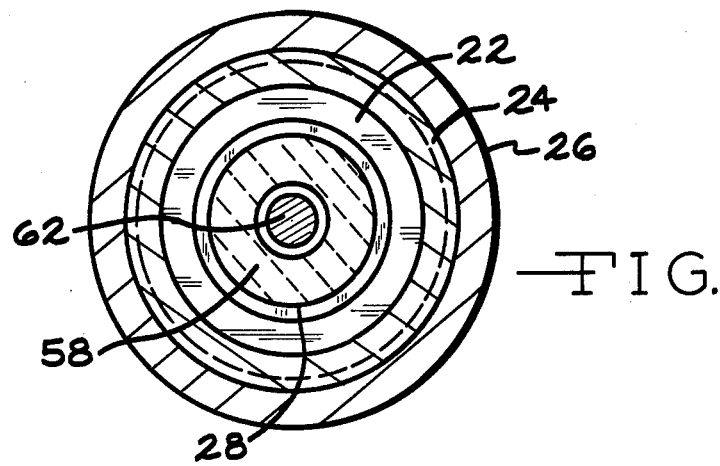
FIG. 3 is a sectional view of the probe taken substantially from line 3—3 in FIG. 2.

The probe 10, as illustrated in FIGS. 2 and 3, consists of an elongated cylindrical housing structure 20 comprises of a tube 22, a coupling 24, and a cap 26. The tube 22, which is formed of stainless steel or other suitable metallic material, is cylindrical in shape having an internal passageway 28, and open upper and lower ends 30 and 32. The coupling 24 surrounds and is suitably secured to the tube 22 at its upper end 30 such as by welding, although other means of securing the coupling 24 to the tube 22 can be readily effected. The outer surface of the coupling 24 is threaded at 29 so that the cylindrical cap member 26 which has threads formed on its inner surface can be threadably mounted on the coupling 24. The cap member 26 has a closed end 34 through which a hole 36 is formed. The housing structure 20 thus has an axial passageway or internal cavity 37 extending between the closed end 34 of the cap 26 and the open end 32 of the tube 22.

A flexible metallic diaphragm member 46 is mounted on the tube 22 at its lower end 32 so as to cover and close the passageway 37. The diaphragm member 46 can be formed from stainless steel, for example, and can be secured to the tube 2 by welding, soldering, or other suitable means so long as a fluid-tight seal and electrical contact is effected between the diaphragm member 46 and the housing structure 20.

A transducer 48 such as a piezoelectric crystal formed of a temperature resistant material such as lead-zicronate-titanate (PZT) is located in the passageway 37 and is forcibly maintained in direct engagement with the diaphragm member 46. The transducer 46 is imbedded in a metallic ceramic holder 50 having a projecting extension or collar 52 that extends in an axial passageway 54 in an annular electrically insulating sleeve structure 56.

The annular insulating sleeve structure 56 includes a pair of sleeve members 58 and 60 which are axially aligned with each other with the sleeve 60 being located between the sleeve 58 and the cap 26 so as to define the passageway 54 extending substantially over the length of the housing structure 20. The outside diameter of the sleeve member 58 is greater than the outside diameter of the sleeve 60 while the inside diameters of the sleeve members 58 and 60 are substantially equal. The collar of the holder 50, having an outside diameter that is slightly smaller than the inside diameter of the sleeve 58, readily telescopes into the passageway 54.

A conductor 62 is connected to the transducer 48 and extends through the passageway 54 of the insulating sleeve members 58 and 60 which protect it from extreme temperatures in the fluid that can range from a high of 1,000° F. down to cryogenic values. The sleeve 58 is shown as being constructed of refractory material while the sleeve 60 is formed of plastic or similar material which exhibits the desired insulating qualitites. The closed end of the cap 26 may be covered with insulation 66 to further insulate the conductor 62, is so desired, although the absence of any insulation 66 would not impair the operation of the probe 10.

As can be seen in FIGS. 2 and 3, the insulating sleeves 58 and 60 are concentrically positioned in the passageway 37. The transducer 48 is spaced away from the tube 22, preferably in a central location in the passageway 37. The surface area of the transducer 48 is less than the surface area of the internal surface of the diaphragm 46 so as to insure that the pressure pulses impinging against the outside surface of the diaphragm 46 will adequately be transmitted against the transducer 48.

A helical spring 70 forming bias means surrounds the sleeve 60 and is interposed between the insulation 66 and the sleeve 58 forcibly urging the sleeve 58 downwardly against the holder 50 thereby urging the transducer 48 into direct engagement with the diaphragm 46. Since the transducer 48 is forcibly urged in contact with the diaphragm 46, compressive as well as tensile pressure pulses are sensed by the transducer 48 without regard to any thermal distortion of the diaphragm member 46.

The conductor 62 forms one lead from the transducer 48 to the analyzing and recording equipment 21. The other lead from the transducer 48 to the analyzing and recording equipment 21 consists of the diaphragm 46, the housing structure 20 and the line 72 which is attached to the cap 26 and extends to the equipment 21.

Figure 4:
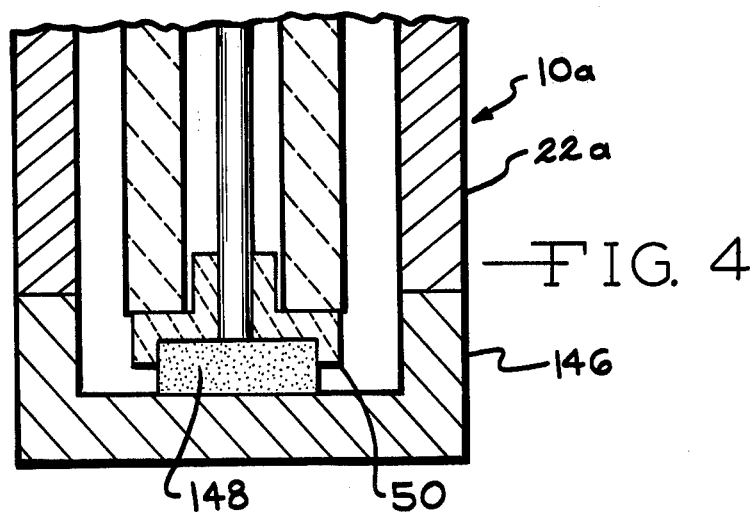
FIG. 4 is an enlarged fragmentary view in section of a modified form of the probe of the present invention.

In a modified form of the present invention, as seen in FIG. 4, a probe 10a is provided with a cup-shaped diaphragm 146 that is sealably mounted on a tube 22a. This diaphragm 146 is thicker and heavier than the diaphragm 46 and is adapted for measuring pressure pulses having higher frequency characteristics because of its higher resonant frequency. In all other respects, the internal construction of the probe 10a is the same as the probe 10. It is envisioned, however, that the diaphragm 146 can be integrally formed with the tube 22 or 22a reducing the fabrication steps involved in the manufacture of the sensing probe. A conductor 162 extends from the transducer 148 to the readout equipment 21.

In operation, the pressure pulses in the fluid in which the probe 10 is immersed will impinge against the diaphragm member 46 and be transmitted through it to the transducer element 48. The distortion of the transducer element 48 generates electric signals which are representative of the pressure pulses impinging against the diaphragm 46 and are transmitted by the conductor 62 to the analyzing and readout equipment 21. The signals are amplified, measured and displayed on a suitable recording instrument such as an oscilloscope, calibrated using a known oscillating pressure field. A direct measurement of the pressure amplitude in the high temperature fluid is thus provided without significant attenuation of the signals before they are sensed by the transducer 48.

Since the piezoelectric element 48 and diaphragm 46 are forcibly maintained in contact with each other, the probe 10 can measure tensile as well as compressibe pulses generated in the fluid medium. Moreover, thermal distortions which occur at high or low temperatures have no effect on the accuracy of the probe 10 since the transducer 48 and diaphragm 46 are always maintained in direct contact.

The probe 10 can easily be disassembled for replacement of the transducer 48. By unscrewing the cap member 26 from the coupline member 24, the annular sleeve structure 56 can be pulled from the tube 22 for easy replacement of the transducer 48.

From the above description, it can be seen that an improved probe 10 is provided for sensing high frequency pressure pulses that exist in any temperature fluid medium. The probe 10 has a high response rate and is capable of detecting high frequency pressure pulses because the transducer element 48 is maintained in direct contact with the flexible diaphragm member 46 to readily detect deflections of the diaphragm member 46 caused by pressure pulses impinging against its exposed surface. Attenuation of the pressure pulse signals is minimized by virtue of the location of the transducer 48 near the point at which the pressure pulses strike the diaphragm 46.

What is claimed:

1. A probe for sensing pressure pulses in a fluid medium comprising a housing having an internal cavity and an opening communicating with said internal cavity, a flexible diaphragm member mounted on said housing in covering relation with said opening, said diaphragm member forming a fluid-tight seal with said housing around said opening, a transducer positioned in said cavity in direct engagement with said diaphragm member, spring means in said cavity interposed between said housing and said transducer forcibly urging said transducer into direct engagement with said diaphragm member so that said diaphragm member is deflected against said transducer in response to pressure pulses impinging against said diaphragm member, a second opening formed through said housing, conductor means connected to said transducer and extending therefrom through said second opening to a location spaced from said probe, insulating means including an annular sleeve structure having an axial passageway, said sleeve structure being disposed in said internal cavity and surrounding said conductor means to protect said conductor means from fluids having extreme temperatures, said spring means forcibly engaging said annular sleeve structure to urge said sleeve structure against said transducer placing said transducer in direct engagement with said diaphragm, and a holder member having an extension collar portion slidably movable into said axial passageway, said holder being engaged by said sleeve structure and supporting said transducer in direct engagement with said diaphragm member.

2. A probe for sensing pressure pulses in a fluid medium comprising an elongated housing structure having opposite ends and an axial passageway extending between and through said ends, a flexible diaphragm member mounted in covering relation over one end of said housing structure and forming a fluid-tight seal therewith, a transducer positioned in said housing passageway in engagement with said diaphragm member, means maintaining said transducer in engagment with said diaphragm member including bias means interposed between said housing structure and said transducer, an annular insulating sleeve structure positioned between and connecting said bias means with said transducer, said bias means yieldably urging said annular sleeve structure against said transducer to maintain said transducer in direct engagement with said diaphragm, said annular insulating sleeve structure having an axial passageway and being positioned in said housing structure so that said sleeve passageway extends away from said transducer, and conductor means connected to said transducer and extending through said sleeve passageway to a location spaced from said probe, said transducer and said diaphragm member being arranged so that said diaphragm member is deflected against said transducer in response to pressure pulses impinging against said diaphragm member, said transducer generating electrical signals which are representative of said pressure pulses impinging against said diaphragm, said electrical signals being transmitted by said conductor means to said location spaced from said probe, and a cap member removeably mounted on said housing structure at the other end thereof, said bias means comprising generally helical spring means surrounding at least a portion of said insulating sleeve structure.

3. A probe according to claim 2 wherein said annular sleeve structure comprises a pair of sleeve members having axial passageways and positioned in general axial alignment with each other, one sleeve member being surrounded by said spring means and having a diameter less than the diameter of at least a portion of the other sleeve member, means mounting said transducer on said other sleeve member, said transducer being positioned in said housing passageway in spaced relation with said housing structure, said spring means being engaged with said other sleeve member to urge said transducer into direct engagement with said diaphragm member.

4. A probe according to claim 3 wherein said cap member has an opening in communication with said housing passageway, said conductor means extending through the passageway of said sleeve members and through said cap member opening.

* * * * *